United States Patent [19]

Lembser

[11] Patent Number: 4,749,002
[45] Date of Patent: Jun. 7, 1988

[54] SHUT-OFF DEVICE IN THE FORM OF A BALL VALVE

[75] Inventor: Gerhard Lembser, Düsseldorf, Fed. Rep. of Germany

[73] Assignee: Ruhrgas Aktiengesellschaft, Essen, Fed. Rep. of Germany

[21] Appl. No.: 44,498

[22] PCT Filed: Jul. 21, 1986

[86] PCT No.: PCT/EP86/00427
§ 371 Date: Mar. 23, 1987
§ 102(e) Date: Mar. 23, 1987

[87] PCT Pub. No.: WO87/00597
PCT Pub. Date: Jan. 29, 1987

[30] Foreign Application Priority Data

Jul. 23, 1985 [DE] Fed. Rep. of Germany ....... 3526258

[51] Int. Cl.⁴ .............................. F16K 5/06; F16K 5/22
[52] U.S. Cl. ................................. 137/246.22; 137/312; 251/172; 251/315
[58] Field of Search ............ 137/246.12, 246.22, 137/312; 251/315, 316, 317, 172, 175

[56] References Cited

U.S. PATENT DOCUMENTS

| | | | |
|---|---|---|---|
| 3,050,077 | 8/1962 | Wheatley | 137/312 |
| 3,079,124 | 2/1963 | Fawkes | 251/317 |
| 3,195,857 | 7/1965 | Shafer | 251/315 |
| 3,208,718 | 9/1965 | White | 251/172 |
| 3,269,692 | 8/1966 | Shafer | 251/172 |
| 3,388,715 | 6/1968 | Ellis | 137/246.22 |
| 3,416,558 | 12/1968 | Works | 137/246.22 |
| 3,473,554 | 10/1969 | King | 137/312 |
| 3,508,736 | 4/1970 | Rhodes et al. | 251/172 |
| 3,512,546 | 5/1970 | King | 137/312 |
| 3,765,440 | 10/1973 | Grove et al. | 137/246.22 |

FOREIGN PATENT DOCUMENTS 270749  9/1950  Switzerland ............... 251/172

Primary Examiner—George L. Walton
Attorney, Agent, or Firm—Spensley, Horn, Jubas & Lubitz

[57] ABSTRACT

The ball valve comprises a body (1) provided with two coaxial pipe stubs (4, 5) wherein a ball means (2) rotatable by means of a rotating shaft device floats. In the closed position, the downstream face of the spherical circumference (12) of said ball means mates with a complementary sphere-bent annular body sealing surface (11), a pressure difference building up between the upstream and the downstream sides of said ball means. Said ball means and said sealing surface form a primary sealing system (11, 12) concentric with the pipe stub axis (10). The sealing function of said primary sealing system is reliably achieved by means of a block and bleed system, the annular body sealing surface (11) being split by an annular groove (13) in the wall of said body concentric with said pipe stub axis (10) connected with the control line (14) of a bleed system (14, 15) penetrating said body wall. Two concentric elastic sealing rings (17) spaced relative to each other are placed on the two sides of said annular groove (13) interfacing with said annular body sealing surface (11), closing a gap between said ball means (2) and said sealing surface (11) until said primary sealing system (11, 12) is effective.

19 Claims, 2 Drawing Sheets

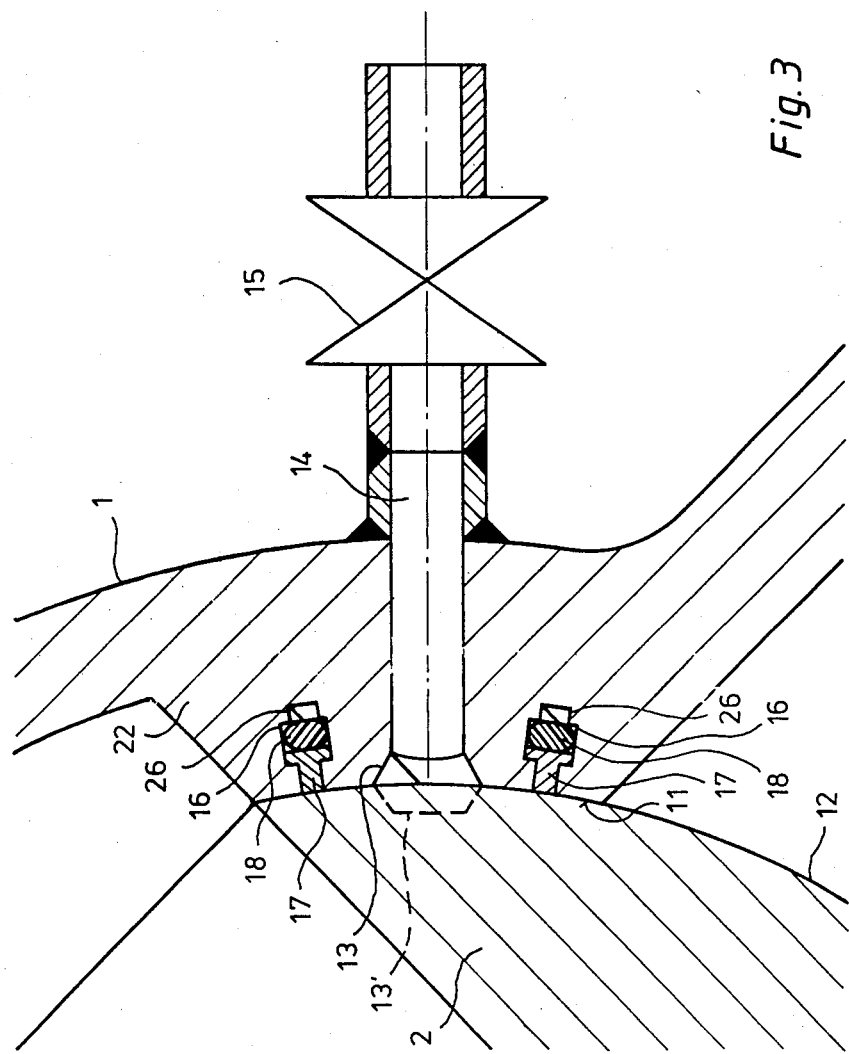

SHUT-OFF DEVICE IN THE FORM OF A BALL VALVE

BACKGROUND OF THE INVENTION

1. Field of the Invention

The present invention relates to an isolating valve of the ball valve type wherein a ball means rotatable by means of a rotating shaft device floats in a body provided with upstream and downstream pipe stubs, the downstream face of the spherical circumference of said ball means mating with a complementary sphere-bent annular body sealing surface, a pressure difference building up between the upstream and the downstream sides of said ball means as said ball means is moved into the closed position, said ball means and said sealing surface forming a primary sealing system which is substantially concentric with the axis of said pipe stubs.

2. Description of Related Art

A variety of isolating valves of different designs such as gate valves, screw-down stop valves, plug valves and check valves are well known. For the design and operation of high-pressure pipelines, gate valves and plug valves are usually employed for small and medium pipeline diameters up to approximately DN 400, whereas ball valves are mostly used for large diameters from DN 500 to DN 1200. The angle of rotation of the latter is only 90°. For sealing, in addition to the load brought to bear by the ball, the pressure difference across an area equivalent to the cross-sectional area of the pipe in the case of floating balls or across an area equivalent to the cross-sectional area of the sealing ring in the case of balls supported by two sealing rings becomes effective. It is therefore an advantage of ball valves over gate valves that the force required for moving the obturator is substantially smaller allowing even large ball valves to be opened or closed by non-motorized manual actuators.

The sealing systems used for such isolating valves are exposed to the fluid passing through the pipeline system in which said valves are incorporated, the exposure depending on the valve design, and may thence be damaged mainly by solid particles carried by the fluid, metal sealing elements being, by the nature of the material, more resistant to wear than non-metallic sealing elements. Ball valves with non-metallic main sealing systems are therefore less fit for pipelines or pipework, if the fluid piped therethrough may carry solid particles.

In view of the complex geometry of ball valve sealing elements, the use of metal seals for ball valves implies complex manufacturing operations and the application of a relatively high force on the seal for tight sealing. Experience has shown that for ball valves, sealing systems comprising a primary metal seal and a secondary non-metallic seal are relatively resistant to wear.

For various repair and inspection operations, it is necessary to ensure reliably in the field that the seal provided by such an isolating valve is absolutely tight. Block and bleed systems are usually used therefor.

It is standard practice to ensure the tightness of the seal by venting the body of such a valve using a drain line. Both in the case of balls supported by two sealing rings and in the case of floating balls, sealing rings on mobile supports following the movement of the ball of such an isolating valve are necessary for so ensuring the tightness of the seal by venting the body of such a valve. The force required for pressing the ball tightly against such a sealing system is produced by springs and the exposure of the annular surfaces to pressure. In the case of floating ball valves, forces acting upon the downstream sealing system are very high because of the pressure difference across the entire valve bore cross-sectional area, whereas the upstream sealing support system must accomodate relatively large axial movements.

The use of such mobile seal supports necessitates two independent sealing systems. One such sealing system is required between the ball and the seal support and a second seal is necessary between said seal support and the body of the valve. The manufacture of such mobile sealing systems for ball valves is complex and the ingress and deposition of solid particles mainly in the inner sealing system frequently interferes with the functioning of such a valve primarily as regards the block and bleed system. The complexity of such conventional sealing systems, increased further by a block and bleed system, has been the cause of numerous valve failures necessitating costly repairs or even the replacement of valves.

SUMMARY OF THE INVENTION

It is an object of the present invention to propose for all pressure ratings and all diameters a ball valve provided both with a simple and sturdy sealing system comprising no mobile parts and with a block and bleed system for reliably ensuring the tight sealing of the ball valve.

For said purpose, the present invention exploits the present state of the art represented by an isolating valve of the type described hereinabove not allowing an ensurance of the tightness of the seal as the ball is moved into the closed position, though. According to the present invention, in a preferred embodiment, the annular body sealing surface is split by an annular groove in the wall of the body of the valve concentric with the pipe stub axis, a control line of a bleed system passing through said wall communicating with said groove.

According to another embodiment of the present invention, the spherical circumference of the ball is provided with a concentric annular groove entirely covered by the annular body sealing system when said ball is in the closed position and a control line of a bleed system passing through the wall of the valve body terminates in said body sealing surface and communicates with said annular groove opposite to said body sealing surface when the ball is in the closed position.

Apart from the ball and the shaft provided for moving said ball, the isolating valve proposed by the present invention does not comprise any moving or mobile parts. The primary sealing system of said valve is a metal seal directly between the ball and the sphere-bent body sealing surface, the large force available for pressing said ball against said sealing surface ensuring an absolutely tight seal which may be verified reliably by way of the annular groove provided in said body sealing surface.

To reduce friction, the ball and the body sealing surface of the valve proposed by the present invention may be coated.

In a further embodiment of the present invention, at least one elastic sealing ring and/or sealing ring carried by an elastic support, concentric with the axis of the pipe stubs and spaced relative to the annular groove is provided in the area of the body sealing surface to close the gap between said body sealing surface and the circumference of the ball means due to manufacturing tolerances and/or tolerances provided for said ball means to float until the primary sealing system becomes effective. Said sealing ring serves as an auxiliary seal as the pressure difference between the upstream and the downstream sides of said ball builds up, small pressure differences being prone to pressure equalization due to letby as fluid leaks around the spherical circumference of said floating ball, if no auxiliary sealing system is provided. A tight seal of the annular gap by means of such a simple sealing ring will allow the pressure difference across said ball to build up, thereby pressing said floating ball against the body sealing surface and allowing the metal primary sealing system to become effective.

Two such sealing rings spaced axially relative to each other on the two sides of the annular groove are preferably provided, said arrangement allowing a verification of the tightness of the auxiliary seal of the annular groove between the body sealing surface and the spherical circumference of the ball in the open position of the ball valve and thence the continual inspection of said auxiliary sealing system by means of the bleed system.

To allow isolating valves according to the present invention to be used for the passage and the blockage of flow in both directions, a further emboidment of the present invention provides for body sealing surfaces with coaxial annular grooves to be arranged on the sphere-bent inner surfaces of the body of the valve adjacent to both pipe stubs, said grooves being symmetric in a plane passing through the axis of rotation of the ball at a right angle to the pipe stub axis.

The auxiliary sealing system provided for by the present invention as described hereinabove may also serve for secondary sealling in the event of a failure of the primary sealing system. For said purpose, a ring designed for elastic deformation which may be exposed to external pressure by a sealing agent which will deform plastically and flows through at least one pressurizing line opening into an annular body duct is accommodated in said duct radially outward from said auxiliary sealing rings, the sealing agent ducting being protected from the ingress of solid particles by said auxiliary sealing rings and said rings designed for elastic deformation. Said plastic sealing agent will increase the force by which the auxiliary sealing rings are pressed against the ball of the valve. Said valve body ducting is preferably provided with a concentric groove in the floor of said duct, the pressurizing line opening into said groove.

As described herein, the present invention satisfies all criteria for the unrestricted use of an isolating valve for high-pressure pipeline and plant pipework applications as the following enumeration demonstrates:

(a) The primary sealing system directly between the body sealing surface and the floating ball is a simple, proven and sturdy sealing system with high sealing forces and a minimum of mobile or moving parts.

(b) The friction forces and moments are, in particular in the case of the use of a ball and a body sealing surface coated by an abrasion-resistant material, sufficiently low for manual valve actuation.

(c) The primary sealing system may be made practically resistant to the effect of temperature.

(d) The bore of the ball valve may have the same size as the pipe cross-sectional area.

(e) The bleed system integrated with the body sealing surface allows the demonstration of the tightness of the seal in the field.

(f) All sealing elements are resistant to solid particle impact and erosion by gaseous or liquid fluids.

(g) Auxiliary sealing rings on elastic supports minimize requirements with respect to manufacturing tolerances and thereby minimize the cost of valve production.

(h) The auxiliary or secondary sealing system may be inspected for the tightness of the seal while the valve is in the open position.

(i) Requirements regarding assembly and maintenance are minimized and adaptability for ancillary systems is optimized.

(j) Parts of a further sealing system are incorporated in the auxiliary sealing system.

An embodiment of the present invention will now be described by way of example with reference to the accompanying drawings in which:

BRIEF DESCRIPTION OF THE DRAWINGS

FIG. 3 is a schematic of detail A shown in FIG. 1 to illustrate the block and bleed arrangement according to the teachings of the present invention.

DETAILED DESCRIPTION OF THE DRAWINGS

Figure 1:
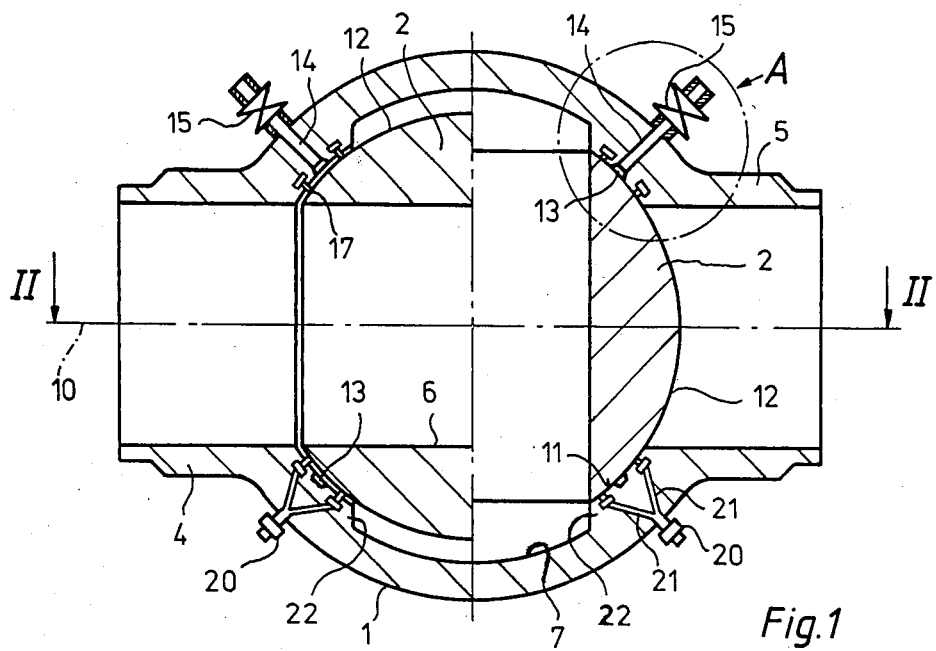
FIG. 1 is a horizontal axial section of an embodiment of the present invention along line I—I in FIG. 2, the ball being in the open position in the left part of the drawing and, turned by 90°, in the closed position in the right part of the drawing.
Figure 2:
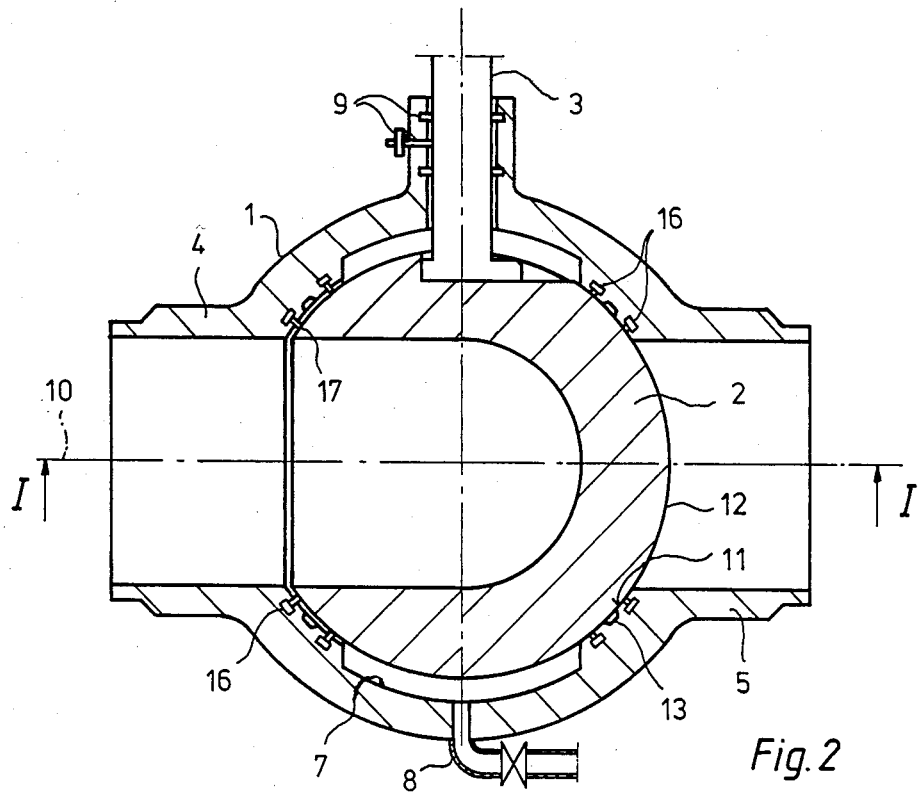
FIG. 2 is a section along line II—II shown in FIG. 1.

The ball valve shown by way of example by FIGS. 1 and 2 comprises a fully welded body (1), a ball means floating therein (2), a block and bleed system (detail A) and a sealed shaft device penetrating the body (3) for moving the ball means (2).

Said body is provided with two coaxial pipe stubs (4, 5) with inside diameters corresponding to the valve connection size. Said ball means (2) is provided with a bore (6) with a diameter equal to said inside diameters of said pipe stubs (4, 5). An annular groove (7) in the valve body with a width corresponding to the diameter of the bore of ball means (2) opens at its lower end into a body drain line (8). The passage for the shaft device for moving ball means (2) is provided with a sealing system (9) specified and sized for the fluid pressure in the pipeline or pipework.

In the open position of ball means (2) shown in the left parts of FIGS. 1 and 2 wherein the ball bore (6) is aligned with the upstream and downstream pipe stubs (4, 5) along the centerline axis (10) of the valve body, a certain clearance exists between the sphere-bent inner body surfaces (11) and the spherical ball circumference (12) shown by out-of-proportion gaps in the left parts of FIGS. 1 and 2. As shown by the right parts of FIGS. 1 and 2 and in FIG. 3, said sphere-shaped surfaces (11, 12) form a primary sealing system concentric with axis (10) when the isolating valve is closed. The high force produced by the pressure difference between the high-pressure side of the valve on the left side in the drawings and the low-pressure side at pipe stub (5) on the right side of valve body (1) ensures a tight seal along the downstream annular body sealing surface (11).

In the area of said annular body sealing surface (11), an annular groove (13) open towards the space inside the valve body is provided in an annular part of the body wall (7) protruding from said wall. The control line (14) of a bleed system schematically represented by a valve (15) is connected with said annular groove (13), said groove (13) and said control line (14) being depressurized in the case of a tight seal provided by a primary sealing system in the area of the body sealing surface (11).

Sealing rings (17), each pressed in an elastic manner against the circumference (12) of ball means (2) by a ring designed for elastic deformation which is supported on the body of the valve, are accommodated in annular ducts (16) on the two sides of said annular groove (13) spaced relative thereto. Said two chamber-type sealing rings (17) represent an auxiliary or secondary sealing system providing a tight seal across the isolating valve in the closed position thereof prior to the build-up of a pressure difference between the upstream and the downstream sides of the valve and the axial displacement of ball means (2) into the sealing position shown in the right parts of FIGS. 1 and 2 Following the build-up of said pressure difference and the direct metal sealing contact between ball means (2) and valve body (1), the auxiliary or secondary sealing system (17, 18) is without importance for the valve function.

If the metal primary seal along the body sealing surface (11) fails as detected by the bleed system (13, 14, 15), an emergency sealing system (20) shown schematically in FIG. 1 may become effective. Said emergency sealing system comprises a pressurizing agent ducting (21) penetrating body (1) and opening into the appropriate annular ducts (16) behind rings (18) for pressing a conventional plastic sealing agent into the chambers (16) of the auxiliary sealing system. An annular groove (26) shown in FIG. 3 is provided in the wall of the valve body in the floors of said ducts to allow a distribution of said sealing agent on large unconfined areas behind said rings (18). Said pressurizing agent ducting is protected by sealing rings (17, 18) of said auxiliary sealing system against the ingress of solid particles. Said plastic sealing agent will increase the force pressing said sealing rings (17) against said ball means (2) or the spherical circumference (12) thereof.

In the embodiment of the present invention shown by the accompanying drawings, the body (1) of the valve is symmetric with respect to a plane passing through the axis of the shaft device provided for ball movement at a right angle relative to axis (10) of said body. An annular sphere-bent body sealing surface (11) is therefore associated with each pipe stub (4 or 5) and becomes effective depending on the direction of the pressure drop across the closed ball means (2), the configurations of the two primary sealing systems on the two sides of the valve body being the same and an annular groove (13) as well as a secondary sealing system and an emergency sealing system being provided for each such primary sealing system. Pipe stub (4) and pipe stub (5) may each thence serve as the inlet stub or the outlet stub of the valve.

In FIG. 3, an annular groove (13) in ball means (2) is depicted by a broken line, said annular groove (13) communicating with control line (14) of the bleed system in the body sealing surface (11) in the body wall in the closed position of the valve depicted by FIG. 3 and thereby being able to replace the annular groove (13) in the body shown by the unbroken line.

I claim:

1. An isolating valve of the ball valve type comprising: an upstream pipe stub;
a downstream pipe stub;
a body providing a passageway for a fluid flowing in a flow direction from the upstream pipe stub to the downstream pipe stub;
a rotatable ball-type core member floatingly arranged in said body for opening and closing said passageway;
actuating means for rotating said core member between a first rotational position in which said passageway is substantially open and a second rotational position, said floating core member in said second rotational position being adapted to close said passageway in response to a pressure difference in said upstream and downstream pipe stubs;
an annular first metallic sealing surface having a spherically concave shape and being formed in said body substantially concentrically to an axis that extends in said flow direction;
a second metallic sealing surface provided on said core member and having a spherically convex shape that is complementary to the shape of said first sealing surface; and
a bleed-system comprising a control conduit penetrating a wall of said body and an annular groove formed in said body for communication with said control conduit and intersecting said first metallic sealing surface into two annular sections such that when said core member has adopted its closing position an intimate surface contact exists between said second metallic sealing surface and both annular sections of said first metallic sealing surface,
wherein a metallic primary sealing system is formed of said first and second metallic sealing surfaces with the bleed-system communicating with the annular groove formed between the two annular sections of said first metallic sealing surface for bleeding off any fluid leakage between the first and second metallic sealing surfaces.

2. An isolating valve as defined in claim 1 wherein said metallic primary sealing system consists only of said first and second metallic sealing surfaces.

3. An isolating valve as defined in claim 1 wherein said ball type core member and said first sealing surface are coated by an abrasion-resistant material thereby minimizing friction.

4. An isolating valve as defined by claim 1 further comprising at least one sealing ring concentrically disposed adjacent said first sealing surface in spaced relationship to said annular groove, said sealing ring being provided to close any gap in said primary sealing system until said primary sealing system becomes effective between said first metallic sealing surface and said second metallic sealing surface.

5. An isolating valve as defined in claim 4 wherein two axially spaced sealing rings are mounted in the area of the annular first sealing surface, one of said sealing rings being positioned in each of said annular sealing sections.

6. An isolating valve as defined in claim 4 wherein said body comprises means for biasing said sealing ring radially inward into said passageway.

7. An isolating valve according to claim 6 wherein said biasing means comprises an annular duct and a resilient support ring supported on a floor of the annular duct, said biasing support ring engaging said sealing ring and seeking to urge said sealing ring radially inwardly so as to project into said passageway.

8. An isolating valve according to claim 7 further comprising emergency sealing means including at least one pressurizing line opening into said duct radially outward from said sealing ring, said emergency sealing means adapted to fill the duct with a plastic sealing agent under pressure and to increase the sealing forces of said sealing ring engaging the second sealing surface.

9. An isolating valve according to claim 8 wherein a concentric groove is provided in the floor of said duct, said pressurizing line opening into said duct floor groove.

10. An isolating valve according to claim 1 wherein said body comprises two metallic first sealing surfaces one of said first sealing surfaces positioned adjacent said upstream pipe stub and the other positioned adjacent said downstream pipe stub, each of said first metallic sealing surfaces including an annular groove formed in said body for communication with a control conduit and intersecting said first metallic sealing surface into two annular sections, wherein said metallic primary sealing system may be formed in response to a selected flowing direction between said floating ball-type core member and one and of said first metallic sealing surfaces.

11. An isolating valve of the ball valve type comprising:
an upstream pipe stub;
a downstream pipe stub;
a body providing a passageway for a fluid flowing in a flow direction from the upstream pipe stub to the downstream pipe stub;
a rotatable ball-type core member floatingly arranged in said body for opening and closing said passageway;
actuating means for rotating said core member between a first rotational position in which said passageway is substantially open and a second rotational position, said floating core member in said second rotational position being adapted to close said passageway in response to a pressure difference in said upstream and downstream pipe stubs;
an annular first metallic sealing surface having a spherically concave shape and being formed in said body substantially concentrically to an axis that extends in said flow direction;
a second metallic sealing surface provided on said core member and having a spherically convex shape that is complementary to the shape of said first sealing surface; and
a bleed system comprising a control conduit penetrating a wall of said opening and opening into said annular first metallic sealing surface, said bleed system further comprising an annular groove formed in said core member and intersecting said second metallic sealing surface into two sections such that when said core member has adopted its closing position said annular groove is entirely covered by said annular first metallic sealing surface with the opening of said control conduit communicating with said annular groove and an intimate surface contact exists between both sections of said second metallic sealing surface and said first metallic sealing surface,
wherein a metallic primary sealing system is formed of said first and second metallic sealing surfaces with the bleed system communicating with the annular groove formed between the two annular sections of said second metallic sealing surface for bleeding off any fluid leakage between the first and second metallic sealing surfaces.

12. An isolating valve as defined in claim 11 wherein said metallic primary sealing system consists only of said first and scond metallic sealing surfaces.

13. An isolating valve as defined in claim 11 wherein said ball type core member and said first sealing surface are coated by an abrasion resistant material thereby minimizing friction.

14. An isolating valve as defined in claim 11 further comprising sealing ring means mounted in said body adjacent said annular first metallic sealing surface and being adapted to coact with said second metallic sealing surface in said second rotational position of said core member so as to close any gap in said primary sealing system before said primary sealing system becomes effective between said first and second metallic sealing surfaces.

15. An isolating valve as defined in claim 14 wherein two axially spaced sealing rings are mounted in the area of the annular first sealing surface, one of said sealing rings engaging one of said sections of the second metallic sealing surface and the other one of said sealing rings engaging the other section of said second sealing surface.

16. An isolating valve defined in claim 15 wherein said body comprises means for biasing said sealing ring radially inward into said passageway.

17. An isolating valve according to claim 16 wherein said biasing means comprises an annular duct and a resilient support ring supported on a floor of the annular duct, said biasing support ring engaging said sealing ring and seeking to urge said sealing ring radially inwardly so as to project into said passageway.

18. An isolating valve according to claim 17 further comprising emergency sealing means including at least one pressurizing line opening into said duct radially outward from said sealing ring, said emergency sealing means adapted to fill the duct with a plastic sealing agent under pressure and to increase the sealing forces of said sealing ring engaging the second sealing surface.

19. An isolating valve according to claim 18 wherein a concentric groove is provided in the floor of said duct, said pressurizing line opening into said duct floor groove.

* * * * *